United States Patent [19]
Goodwin

[11] 3,774,290
[45] Nov. 27, 1973

[54] METHOD OF FABRICATING A BERYLLIUM-TITANIUM COMPOSITE

[75] Inventor: Vernon L. Goodwin, Willoughby Hills, Ohio

[73] Assignee: Brush Wellman Inc., Cleveland, Ohio

[22] Filed: Feb. 9, 1972

[21] Appl. No.: 224,978

[52] U.S. Cl....... 29/420.5, 29/DIG. 31, 29/DIG. 45, 29/DIG. 47, 75/200, 264/111
[51] Int. Cl.............................................. B22f 3/24
[58] Field of Search............ 29/420, 420.5, DIG. 31, 29/DIG. 45, DIG. 47; 264/111; 75/200

[56] References Cited
UNITED STATES PATENTS

| | | | |
|---|---|---|---|
| 3,475,142 | 10/1969 | Abkowitz et al. | 29/420.5 X |
| 3,158,472 | 11/1964 | Von Bogdandy et al. | 75/200 |
| 2,932,882 | 4/1960 | Kelly | 29/420 |
| 3,390,985 | 7/1968 | Croeni et al. | 29/DIG. 45 |
| 3,389,993 | 6/1968 | Lund et al. | 29/420.5 X |
| 3,681,037 | 8/1972 | Abkowitz et al. | 75/200 X |

FOREIGN PATENTS OR APPLICATIONS

| | | | |
|---|---|---|---|
| 688,346 | 6/1964 | Canada | 29/420.5 |

Primary Examiner—Charles W. Lanham
Assistant Examiner—D. C. Reiley, III
Attorney—Harold F. McNenny et al.

[57] ABSTRACT

There is provided a process for forming a beryllium/titanium composite of improved strength and ductility from powdered beryllium and powdered titanium material characterized by blending the powders and extruding a canister containing the billet at a temperature of from 1,375° F. to 1,525° F. to a reduction ratio of from 6:1 to 100:1 or greater to form a solid beryllium/titanium composite. At a temperature of 1,450° F. to 1,475° F. and an extrusion reduction ratio of 10:1 or more, compacting of the blend prior to sealing in an extrusion canister is not necessary to develop similar properties. Composite beryllium titanium bodies so fabricated have tensile elongations superior to materials fabricated up to and including 1,300° F. along with equal to improved strength. Tensile prestressing of the as-extruded bodies at 70 to 80 percent of their ultimate tensile strength further improves the yield strength by 50 percent to 100 percent greater and more above that of the as-extruded state with little change in ultimate tensile strength and elongation.

30 Claims, No Drawings

METHOD OF FABRICATING A BERYLLIUM-TITANIUM COMPOSITE

BACKGROUND OF THE INVENTION AND PRIOR ART

Beryllium metal offers one of the highest specific elastic moduli (elastic modulus/density) of any existing metal. However, because of its low fracture toughness and high fabrication costs, its use as a structural material has been limited. Titanium and its alloys, on the other hand, have good specific strength (strength/density) and acceptable fracture-toughness properties, but a lower than desired elastic modulus. Alloying of beryllium and titanium by conventional melting practices cannot avoid the formation of substantial amounts of brittle intermetallic phases which cause the overall alloy to be brittle.

Fabrication of beryllium/titanium composites from powered beryllium and titanium materials has already been investigated and reported by Abkowitz in U.S. Pat. No. 3,475,142. Abkowitz limited the temperature of processing and treatment to 1,300° F. and below in order to ensure against the formation of titanium beryllide interaction products between beryllium and titanium particles. Such intermetallic structures are recognized as being brittle and causing nonductile bonds leading to premature failure under stressing. The present work has found in processing from 1,375° F. and higher that powder-powder composite bodies were formed exhibiting greater tensile ductility than those fabricated at 1,300° F. and below. Also higher strength resulted in processing composite beryllium/titanium material in the range of 1,375° F. to 1,525° F. This is contrary to the art taught by Abkowitz and to that generally recognized presently by material scientists. Metallographic examination at 500 – 10,000X of beryllium/titanium composites made by processing power blends from 1,100° F. – 1,525° F. showed no evidence of significant interparticle titanium beryllide reaction at 1,300° F. and below, but did find evidence of some at 1,375° F. and above, the reaction zone being thicker with higher temperatures and longer times of exposure at these temperatures.

One purpose of the present invention is to provide a beryllium/titanium composite material having a modulus of elasticity substantially greater than that of titanium (16 × 10⁶ psi), a density similar to or slightly greater than that of aluminum (0.10 to 0.135 lb. per cubic inch), a tensile ductility of 1.5 percent or greater, and a notched Charpy impact strength of 5 foot pounds or greater at room temperature. These characteristics are considered by aircraft engine manufacturers to be worthy properties for gas turbine fan and compressor blades.

The density and modulus of elasticity requirements above set forth are satisfied by beryllium/titanium composites containing from 40 to 60 volume percent beryllium, balance titanium or titanium alloy. The present invention, however, is also applicable to powder-derived composites of beryllium and titanium outside of the 40 to 60 percent by volume beryllium for which uses may be contemplated in aerospace structures and elsewhere.

The present process eliminates many of the steps taught by the prior art, enables the utilization of commercial beryllium and commercial titanium powders without sacrificing raw material and processing savings. The present process further enables the use of higher hot working temperatures at which extrusion can be effected more readily allowing greater reductions, lower loads on tooling or fabrication of more complex shapes. Finally, the present process produces composite material of much improved tensile ductility which infers a substantially higher notched charpy impact strength and toughness.

BRIEF STATEMENT OF THE INVENTION

Briefly stated, the present invention is in a process and product produced thereby for forming solid composites from powdered beryllium and powered titanium or titanium alloy. The process comprises the steps of blending to form a loose sealed of commercial powdered beryllium with commercial powdered titanium.

Depending upon the extrusion conditions later to be employed, the power blend may be compacted to form a self-supporting green billet. The billet, or as will later be described the loose charge of blended powders, is then selaed into an extrusion canister and the canister extruded at a temperature of from 1,375° F. to as high as 1,525° F. to a reduction ratio of from 6:1 to 100:1 or greater. The extruded article which may be formed in one pass or a series of stages is a solid beryllium/titanium composite.

If the extrusion temperature is greater than 1,400° F. and not more than 1,525° F. and the reduction ratio is at least 10:1, then it is not necessary to compact the powder into a green billet prior to placing in the extrusion canister. Also, use of a non-oxidizing atmosphere may be avoided.

When the as-extruded solid composite body is cooled to room temperature from the range of 1,375° F. to 1,525° F., because of the high coefficient of expansion character of the beryllium component and also because of the high modulus of elasticity of the beryllium in comparison with that of the titanium component, a residual tensile stress is built up in the beryllium component.

|  | Modulus of Elasticity 0–1400°F.(10⁶ psi) | Coefficient of Expansion Micro-in./in./°F. |
| --- | --- | --- |
| Beryllium | 9.4 | 40–44 |
| Titanium | 6.2 | 16–19 |

This invention has found that tensile prestressing to the extent of approximately 70 to 80 percent of the ultimate tensile strength increases the tensile proportional limit manifold and increases the 0.2 percent offset yield strength up to twice that exhibited by the as-extruded body. No significant change in ultimate strength or ductility in tension is generally effected by prestressing as described.

DETAILED DESCRIPTION OF THE PROCESS

The present process contemplates the use of commercially produced and readily available fine powders of beryllium and titanium. This is in contradistinction to specially produced powders such as the micro-quenched, age-formed, "shot" powders of the prior art. Quite obviously, the conversion of commercial powders to the micro-quenched, age-formed, shot condition materially increases the cost of these starting materials.

The beryllium powder used in accordance with this work is commerically available and is conveniently a vacuum-cast metal comminuted by chipping and grinding in an attrition mill by known procedures. Several fractions of standard structural grade powder have been used in accordance with the present process ranging in size from −50 + 100 mesh or 0.012 inch to 0.006 inch diameter down to −15 + 1 micron or 0.0006 to 0.00004 inch. These include a +50 + 100 mesh fraction, a −100 fraction, a −100 + 200 mesh fraction, and a −325 mesh fraction. Also, a −15 + 1 micron powder has been used which represents a ball-milled, air-classified product. Typically, a −50 + 100 mesh product contains 0.25 wt. percent oxygen. A −100 + 200 mesh beryllium powder typically contains 0.35 wt. percent oxygen. A +325 mesh beryllium powder typically contains 0.75 wt. percent oxygen. A −15 + 1 micron powder typically contains 2.70 wt. percent oxygen and may contain from near 0 up to 4 wt. percent beryllium oxide calculated as oxygen. It has been found that a beryllium oxide content within the limits stated above provides the strengthening effect on consolidated beryllium/titanium composite bodies. The titanium powders may consist of up to 100 percent titanium or a commercially available powdered titanium alloy. These products may be produced commercially by the conventional hydride-dehydride process, which is well known, or by other commerical processes. The titanium powders are pretreated by screening to a −50 + 325 mesh size and optionally may be stored under an inert gas (argon) atmosphere to minimize oxidation. (As used herein, the notation "−50 + 325 mesh" means that the quantity of powder so defined will pass through a 50 mesh screen and be retained on a 325 mesh screen [Tyler screen size]). Titanium alloys which may be used in accordance herewith include specifically Ti-5A1-2.5Sn and Ti-6A1-4V. Other commercial and special alloys may be used. The titanium input powders typically contain from 0.13 percent to 0.22 percent oxygen.

The processing steps in accordance with the present invention have been reduced compared to those of the prior art. In brief, the steps of the process include: blending the beryllium and titanium powders, cold compacting the powders, hot compacting, placing in an extrusion canister, extrusion at 1,375° F. − 1,525° F. with a reduction ratio of 6:1 to 100:1 and greater, and finally tensile prestressing of the extruded composite at 70 − 80 percent of the ultimate strength. Compacting steps before extrusion and prestressing after extrusion are optional as explained below.

The powders are blended in the desired ratio. Blending of the powders may be accomplished by any suitable means. It has been found that a twin shell blender is especially suitable for use in blending the beryllium and titanium powders and a period of time ranging from 30 to 60 minutes has been found adequate.

The powder as blended may be "canned" or placed directly into an extrusion canister provided the extrusion conditions of temperature and extrusion ratio are above certain limits. Where the blended powder is not placed directly into the extrusion canister, it is desirably first compacted to form a green billet. This procedure is carried out by cold compaction under isopressing conditions wherein the powder is placed in a rubber compaction bag, the bag sealed and immersed in a suitable fluid medium and a pressure of 30 tons per square inch applied thereto. Compaction for lab extrusions measured approximately 1.75 inches in diameter by 4 inches long and wer compacted to a density of approximately 70 percent of the theoretical maximum density. In commercial operations, compactions for blend extrusion measure from 5 − 6 inches in diameter by 12 − 18 inches long and have a density of approximately 70 percent of theoretical.

Hot pressing, also an optional procedure, is carried out again at a temperature below that which is conducive to the formation of titanium beryllides, e.g. 1,300° F. in tooling which is maintained at a temperature in the range of from 600° to 900° F. The hot compaction pressure is in the range of from 50 to 110 tons per square inch. Essentially full theoretical density is achieved under these conditions.

Either the blended powder or the green cold isopressed billets are manually fitted into steel extrusion containers for hot extrusion which optionally may be preceded by hot compaction. The wall thickness of the extrusion canisters varies from approximately one thirty-second inch to one-half inch, depending upon dimensional convenience, the tooling, and the extrusion apparatus. Steel end closure discs are then welded to the steel canister to provide a vacuum-withstanding seal. The canisters are optionally then evacuated (while being heated to 600° to 1,300° F.) to from less than 1 to 17 microns pressure through a suitable stainless steel or copper evacuation tube. The evacuated canister is vacuum sealed by a process wherein the stainless steel tube is seam-welded to effect closure or the copper vacuum line is "pinched off."

If extrusion is preceded by a separate hot pressing step, then the hot press billet jacketed in a steel canister may then be extruded directly or removed from the canister, machined to fit a fresh canister and recanned. In any event, the extrusion billet, jacketed in a one thirty-second to one-half inch wall thickness steel can is heated for 30 minutes or less per inch initial diameter at a temperature in the range of from 1,375° to 1,525° F., preferably 1,400° to 1,450° F., (at which temperature titanium beryllides will form) and may be extruded in a lubricated, streamlined flow manner with tooling at 800° to 1,000° F. into a desired shape. Reduction in cross-sectional areas from jacketed billet to clad extrusion amounts to from 6:1 to as high as 100:1. Extrusion pressures of from 50 to 110 tons per square inch may be utilized in the extrusion of the jacketed beryllyim titanium composite material. Extrusion pressures are not critical and will vary depending upon the equipment used, the lubricant system, the dies, etc.

When extrusion reduction ratios upwards of 15:1 are desired, it may be found convenient to re-extrude the jacketed billets at the same elevated temperature above 1,375° F. using portions of clad extruded rod or shape. Alternatively, the cladding may be stripped, and the beryllium/titanium composite re-jacketed for further reduction in cross-sectional area. In this latter case, bundles of previously extruded and dejacketed composite rod or shapes may be both further reduced in cross section and metallurgically bonded together in this secondary extrusion operation.

The resultant extruded beryllium titanium composite after cooling to room temperature may be given a "prestress" at 70 to 80 percent of its ultimate tensile strength in order to remove normal residual tensile stresses present in the beryllium phase due to incompatibilities in contraction and modulus of elasticity and to impose a new residual compressive stress on the beryllium phase. With such prestressing, the material then elastically deforms in tension according to its true modulus of elasticity which is in the range of from 26 to 32 × 10⁶ pounds per square inch up to high stress levels. The 0.2 percent offset yield strength, an important engineering design parameter, has then been substantially raised.

It is here again pointed out that the processing temperatures of the present invention are generally higher than those previously used for the reason that hot working processes such as extrusion are facilitated. By this is meant that pressures required to extrude decrease with higher temperature, and greater reduction of cross section can be effected for equivalent pressures at 1,375° F.–1,525° F. as compared to 900°–1,300° F. used in prior art. For equal reduction ratios lower pressures are required, resulting in longer tool life. It has been found that beryllium/titanium composites hot extruded at 1,375°– 1,525° F. exhibit comparable to greater tensile strength but greater ductility than those extruded at 1,300° F. and below. A titanium beryllide structure has been metallographically identified between contacting beryllium and titanium particles when the composite is extruded at 1,375° F. and higher. Development of this phase may result in a stronger bond providing greater strength and ductility. Material extruded at 1,525° F. and above exhibits lower strength and ductility, perhaps because the interparticle titanium beryllide structure has grown excessively thick.

It becomes convenient to illustrate the process and the resulting products produced in accordance with the present invention by specific examples presented in tabular form. Table I shows Examples 1 to 7 in which products are produced utilizing 60 volume percent beryllium derived from −50 + 100 mesh (0.012 inch to 0.006 inch diameter) attritioned beryllium powder and 40 volume percent of −50 + 325 mesh (0.012 inch to 0.0018 inch diameter) Ti–6Al–4V hydride powder. Powders were both cold and hot compacted before extrusion. These runs demonstrate in extruding at 1,400° and 1,450° F. an elongation superior to that developed by extruding at 1,300° F. is achieved along with a suitably high strength and modulus of elasticity.

Table II sets forth Examples 8 and 9, made utilizing 60 volume percent beryllium derived from finer −100 + 200 mesh (0.006 inch to 0.003 inch diameter particles) attritioned beryllium powder and 40 percent by volume of −50 + 325 mesh (0.012 to 0.0018 inch diameter) Ti–6Al–4V hydride powder. These runs demonstrate that extrusion at temperatures above 1,300° F., in this case 1,400° F., are desirable. The finer beryllium powder was quite suitable, but no improvement over the −50 + 100 mesh input was shown.

TABLE I.—MECHANICAL PROPERTIES VERSUS EXTRUSION CONDITIONS FOR 60 Be-40 Ti VOLUME PERCENT COMPOSITES

[Be powder, −50+100 mesh; Ti-6Al-4V powder, −50+325 mesh; Cold compacted at 30 t.s.i.; Hot compacted at 86 t.s.i. at 1,300° F.]

| Example | Extrusion conditions | | Mechanical properties | | | |
|---|---|---|---|---|---|---|
| | Temp. (° F.) | Reduction ratio | Tensile strength (k.s.i.) | Yield strength (k.s.i.) | Elong., percent | Mod. of el. (10⁶ p.s.i.) |
| 1 | 1,200 | 6 | 64.1 | 61.7 | 0.50 | 32 |
| 2 | 1,300 | 6 | 62.8 | 54.0 | 0.50 | 32 |
| 3 | 1,300 | 8 | 78.3 | 61.2 | 0.47 | 32 |
| 4 | 1,300 | 10 | 82.9–99.9 | 46.1–53.5 | 0.45–0.75 | 32 |
| 5 | 1,300 | 48 | 122.3 | 63.3 | 0.50 | 32 |
| 6 | 1,400 | 20 | 112.1 | 48.6 | 2.0 | 32 |
| 7 | 1,450 | 20 | 114.8 | 46.5 | 2.0 | 32 |

TABLE II.—MECHANICAL PROPERTIES VERSUS EXTRUSION CONDITIONS FOR 60 Be-40 Ti VOLUME PERCENT COMPOSITES

[Be powder, −100+200 mesh; Ti-6Al-4V powder, −50+325 mesh; Cold compacted at 30 t.s.i.; Hot compacted at 86 t.s.i. at 1,300° F.]

| Example | Extrusion conditions | | Mechanical properties | | | |
|---|---|---|---|---|---|---|
| | Temp. (° F.) | Reduction ratio | Tensile strength (k.s.i.) | Yield strength (k.s.i.) | Elong., percent | Mod. of el. (10⁶ p.s.i.) |
| 8 | 1,300 | 10 | 71.3–74 | 50–53.7 | 0.4–0.45 | 32 |
| 9 | 1,400 | 20 | 115.5 | 55 | 1.5 | 32 |

Table III shows Examples 10 to 13, inclusive, involving 50 volume percent beryllium derived from −50 + 100 mesh beryllium attritioned powder and standard Ti–6Al–4V or Ti–5Al–2.5Sn hydride powders. Hot compaction prior to extrusion was eliminated in this case. The data show that an extrusion temperature of at least 1,375° F. is desirable. The procedure omitting separate hot compaction resulted in satisfactory extruded bodies. Both titanium alloys were extruded at 1,375° F. to 1,425° F. into satisfactory bodies of acceptable strength and modulus, but with improved tensile ductility over that of material extruded at 1,300° F.

Table IV sets forth runs 14 and 15 involving 50 volume percent beryllium from fine −15 + 1 micron ball-milled powder and standard Ti–6Al–4V powder of −50 + 325 mesh particle size. Powder blends were cold compacted to green billets which were then directly with no prior hot compaction extruded at 1,300° F. and 1,450° F. into rod at a 16:1 extrusion ratio. These runs again demonstrate that extruded composite material of improved tensile elongation can be achieved by 1,450° F. extrusion compared to a temperature of 1,300° F.

TABLE III.—MECHANICAL PROPERTIES VERSUS EXTRUSION CONDITIONS FOR 50 VOLUME PERCENT Be/Ti COMPOSITES

[Be powder, −50+100 mesh; Ti alloy powder, −50+325 mesh; Cold compacted at 30 t.s.i.; No hot compaction]

| Example | Extrusion conditions | | Mechanical properties | | | | Titanium alloy |
|---|---|---|---|---|---|---|---|
| | Temp. (° F.) | Red. ratio | Tensile strength (k.s.i.) | Yield strength (k.s.i.) | Elong., percent | Mod. of el. (10⁶ p.s.i.) | |
| 10 | 1,300 | 16 | 116 | 49 | 0.7 | 28 | Ti-5Al-2½Sn |
| 11 | 1,375 | 16 | 115 | 48 | 1.9 | 29 | Ti-6Al-4V |
| 12 | 1,400 | 16 | 133 | 51 | 1.5 | 29 | Ti-6Al-4V |
| 13 | 1,425 | 16 | 115 | | 2.4 | 29 | Ti-5Al-2½Sn |

TABLE IV.—MECHANICAL PROPERTIES VERSUS EXTRUSION CONDITIONS FOR 50 VOLUME PERCENT Be/Ti COMPOSITES

[Be powder, −15 +1 micron; Ti-6Al-4V powder, −50 + 325 mesh; Cold compacted at 30 t.s.i.; No hot compaction]

| Example | Extrusion conditions | | Mechanical properties | | | |
|---|---|---|---|---|---|---|
| | Temp. (° F.) | Red. ratio | Tensile strength (k.s.i.) | Yield strength (k.s.i.) | Elong., percent | Mod. of el. ($10^6$ p.s.i.) |
| 14 | 1,300 | 16 | 95 | 67 | 0.9 | 34 |
| 15 | 1,450 | 16 | 90 | 60 | 3.7 | 29 |

Table V lists data for runs 16, 17, and 18 using 60 volume percent beryllium from standard −50 + 100 mesh powder and 40 percent volume Ti-5Al-2.5Sn −50 + 32 mesh hydride powder. Blended powder was cold compacted but not hot compacted. Extruded material was evaulated both as-extruded and after tensile "prestressing" at 70 – 80 percent of the ultimate tensile strength. These runs demonstrate that improved tensile ductility is developed in composites extruded at 1,400° F. as compared to 1,100° and 1,200° F. and, in this case, improved strength is also realized. Prestressing is shown to increase the yield strength as much as 70 percent of the as-extruded value. It is effected by placing the extrudate, e.g., a bar, under a tensile stress as by grasping the ends in spaced jaws or clamps and imposing a tensile stress of up to 80 percent of the ultimate tensile stress. Equipment such as a stretcher-straightener may be used for prestressing of alloy composites in which the individual metals have different elastic limits. The extent of prestressing exceeds the elastic limit of one metal, e.g., beryllium, but not the other, e.g., titanium. The result is to place the less elastic component of the composite under compression.

Table VI sets forth data for runs 19, 20, and 21 covering 40 volume percent beryllium derived from standard −50 + 100 mesh powder and 60 volume percent Ti-6Al-4V derived from standard −50 + 325 mesh hydride powder. Blended powder was cold compacted but not hot compacted. These runs demonstrate again that a composite fabricated by extrusion at 1,400° to 1,525° F. developed a relatively high tensile elongation along with suitable strength and modulus. Tensile prestressing as-extruded material at 70 – 80 percent of the ultimate strength is again shown to increase the yield strength to a two-fold value and higher.

Table VII lists data developed in run 22 wherein is involved a 60 volume percent beryllium and 40 volume percent Ti-6Al-4V derived from standard powders. Blended powder in this case was loaded loosely into the extrusion canister and directly extruded to composite rod without prior cold and hot compacting. This run demonstrates that direct extrusion of loose powders as well as a 1,450° F. extrusion temperature are processing conditions which produce a powder-derived Be-Ti composite with relatively high tensile ductility and strength.

Prestressing of beryllium/titanium composites as extruded has been found highly beneficial regardless of the temperature of extrusion or the presence or absence of titanium beryllides. Note Examples 16 and 17

TABLE V.—MECHANICAL PROPERTIES VERSUS EXTRUSION CONDITIONS FOR Be/Ti COMPOSITES

[Volume percent, 60% Be/40% Ti-5Al-2.5 Sn; Be powder, −50 +100 mesh; Ti-5Al-2.5 Sn powder, −50 +325 mesh; cold compacted at 30 t.s.i.; no hot compaction]

| Example | Extrusion conditions | | As extruded | | | Prestressed 70-80% of ult. strength | | |
|---|---|---|---|---|---|---|---|---|
| | Temp. (° F.) | Red. ratio | Tensile strength (k.s.i.) | Yield strength (k.s.i.) | Elong., percent | Tens. str. (k.s.i.) | Yield str. (k.s.i.) | Mod. of el. ($10^6$ p.s.i.) |
| 16 | 1,100 | 8 | 75 | 59 | 0.4 | 70 | 70 | 32 |
| 17 | 1,200 | 14 | 91 | 49 | 0.7 | 86 | 84 | 32 |
| 18 | 1,400 | 14 | 123 | 62 | 2.9 | 129 | 97 | 32 |

TABLE VI.—MECHANICAL PROPERTIES VERSUS EXTRUSION CONDITIONS FOR Be/Ti COMPOSITES

[Volume percent, 40% Be/60% Ti-6Al-4V; Be powder, −50 +100 mesh; Ti-6Al-4V powder, −50 +325 mesh; cold compacted at 30 t.s.i.; no hot compaction]

| Example | Extrusion conditions | | As extruded | | | Prestressed 70-80% of ult. strength | | |
|---|---|---|---|---|---|---|---|---|
| | Temp. (° F.) | Red. ratio | Tensile strength (k.s.i.) | Yield strength (k.s.i.) | Elong., percent | Tens. str. (k.s.i.) | Yield str. (k.s.i.) | Mod. of el. ($10^6$ p.s.i.) |
| 19 | 1,400 | 14 | 139 | 59 | 5.5 | 147 | 107 | 29 |
| 20 | 1,450 | 20 | 143 | | 4.9 | 140 | 102 | 29 |
| 21 | 1,525 | 20 | 131 | 55 | 1.6 | 130 | 127 | 29 |

TABLE VII.—MECHANICAL PROPERTIES VERSUS EXTRUSION CONDITIONS FOR Be/Ti COMPOSITES

[Volume percent, 60% Be/40% Ti-6Al-4V; Be powder, −50 +100 mesh; Ti-6Al-4V powder, −50 +335 mesh; no cold or hot compaction]

| Example | Extrusion conditions | | As extruded | | | Prestressed 70-80% of ult. strength | | |
|---|---|---|---|---|---|---|---|---|
| | Temp. (° F.) | Red. ratio | Tensile strength (k.s.i.) | Yield strength (k.s.i.) | Elong., percent | Tens. str. (k.s.i.) | Yield str. (k.s.i.) | Mod. of el. ($10^6$ p.s.i.) |
| 22 | 1,450 | 20 | 110 | 48 | 1.1 | | | 32 | above. Also, as long as beryllium and titanium are extruded in juxtaposition to each other, the geometric form of either is unimportant to improved results by prestressing. Thus rods of each may be combined, extruded and then prestressed to yield improved strength properties; or rods of Be or Ti (or Ti alloy) may be combined, respectively, with a powder of Ti (or Ti alloy) or Be to yield "fibrous" products on extrusion; or rods of one metal may be drilled and the bores filled with powder of the other; or rods of Be/Ti composite may be combined with powder of Be or Ti (or Ti alloy), extruded, and prestressed.

What is claimed is:

1. A process for forming a solid composite from powdered beryllium and powdered titanium or titanium alloy, and interreaction products of titanium and beryllium, and which comprises the steps of:
   a. blending to form a loose blend:
      1. commercial powdered beryllium;
      2. commercial powdered titanium or titanium alloy;
   b. compacting the blend to a handleable, self-supporting green billet;
   c. sealing said billet into and extrusion canister;
   d. extruding said canister/billet assembly at a temperature of from 1,375° F. to 1,525° F. to a reduction ratio of from 6:1 to 100:1 or greater to form a solid beryllium/titanium composite; and
   e. subsequently separating said solid beryllium/titanium composite from said extrusion canister.

2. A process in accordance with claim 1 which also includes the step of tensile prestressing the extruded composite.

3. A process in accordance with claim 1 in which the beryllium has a particle size in the range of $4 \times 10^{-5}$ inch to $1 \times 10^{-2}$ inch.

4. A process in accordance with claim 1 in which the beryllium has a beryllium oxide content from 0.2 percent to 4.0 percent by weight calculated as oxygen.

5. A process in accordance with claim 1 in which the powered titanium material is Ti–6Al–4V alloy.

6. A process in accordance with claim 1 in which the powered titanium material is Ti–5Al–2.5Sn alloy.

7. A process in accordance with claim 1 in which the particle size of the powdered titanium material is in the range of $1 \times 10^{-4}$ inch and $1 \times 10^{-2}$ inch.

8. A process in accordance with claim 1 in which the composite contains 40 to 60 percent by volume beryllium and the remainder titanium or titanium alloy.

9. A process in accordance with claim 1 in which the step of compacting includes:
   a. loading the loose blend of powders into an elastomeric container,
   b. isopressing the loaded container to increase the density of the blend and
   c. subsequently separating the elastomeric container from the isopressed powders.

10. A process in accordance with claim 9 in which the blend is isopressed to about 70 percent of theoretical density.

11. A process in accordance with claim 9 in which the pressure of isopressing is approximately 30 tons per square inch.

12. A process in accordance with claim 9 in which the compacting step is performed at room temperature.

13. A process in accordance with claim 1 in which each of the powders is rendered gas free by heat soaking at from 600° F. to 1,300° F. for at least 1 hour under a pressure of from less than 1 micron to 17 microns and cooled to room temperature.

14. A process in accordance with claim 13 in which the cooling to room temperature is done in vacuo over a period of from 16 to 24 hours.

15. A process in accordance with claim 1 wherein handling of the gas-free powders throughout the process is done in a dry inert gas atmosphere.

16. A process in accordance with claim 15 in which the inert gas is argon.

17. A process in accordance with claim 1 in which the extrusion canister is low carbon steel or copper.

18. A process in accordance with claim 1 in which the canister is evacuated prior to extrusion.

19. A process in accordance with claim 1 also including the step of hot compacting the billet prior to extrusion to essentially full theoretical density at 1,300° F.

20. A process for forming a solid composite from powdered beryllium and powdered titanium or titanium alloy and interreaction products of titanium and beryllium, and which comprises the steps of:
   a. blending in air to form a loose blend:
      1. commercial powdered beryllium;
      2. commercial powdered titanium or titanium alloy;
   b. sealing said loose blend into an extrusion canister;
   c. extruding said canister/blend assembly at a temperature greater than 1,400° F. and no more than 1,525° F. to a reduction ratio of from 20:1 to 100:1 or greater to form a solid beryllium/titanium composite; and
   d. subsequently separating said solid beryllium/titanium compisite from said extrusion canister.

21. A process in accordance with claim 20 in which the beryllium has a particle size in the range of $4 \times 10^{-5}$ inch to $1 \times 10^{-2}$ inch.

22. A process in accordance with claim 20 in which the beryllium has a beryllium oxide content from 0.2 percent to 4.0 percent by weight calculated as oxygen.

23. A process in accordance with claim 20 in which the particle size of the powdered titanium material is in the range of $1 \times 10^{-4}$ inch and $1 \times 10^{-2}$ inch.

24. A process in accordance with claim 20 in which the composite contains 40 to 60 percent by volume and the remainder titanium or titanium alloy.

25. A process for forming a solid composite from powdered beryllium and powdered titanium or titanium alloy and interreaction products of titanium and beryllium formed in situ, and which comprises the steps of:
   a. blending in an inert gas to form a loose blend:
      1. commercial powdered beryllium;
      2. commercial powdered titanium or titanium alloy;
   b. loading the loose blend of powders into an elastomeric container in a dry argon gas atmosphere;
   c. isopressing to about 70 percent theoretical density the loose blend under a pressure of approximately 30 tons per square inch, and isopressing being carried out at room temperature to form a green billet;
   d. separating the elastomer container from said green billet;

e. sealing said green billet into a steel canister in a dry argon gas atmosphere;
f. evacuating said canister;
g. hot compacting the billet in said canister to essentially full theoretical density at 1,300° F.;
h. extruding said canister/billet assembly at a temperature of from 1,375° F. to 1,525° F. to a reduction ratio of from 6:1 to 100:1 or greater to form a solid beryllium/titanium composite; and
i. subsequently separating said solid beryllium/titanium composite from said extrusion canister.

26. A process in accordance with claim 20 in which the beryllium has a particle size in the range of $4 \times 10^{-5}$ inch to $1 \times 10^{-2}$ inch.

27. A process in accordance with claim 20 in which the beryllium has a beryllium oxide content from 0.2 percent to 4.0 percent by weight calculated as oxygen.

28. A process in accordance with claim 20 in which the particle size of the powdered titanium material is in the range of $1 \times 10^{-4}$ inch and $1 \times 10^{-2}$ inch.

29. A process in accordance with claim 20 in which the composite contains 40 to 60 percent beryllium by volume and the remainder titanium or titanium alloy.

30. A process for forming a solid composite from beryllium and titanium or titanium alloy, and which comprises the steps of:
a. combining
  1. commercial beryllium;
  2. commercial titanium or titanium alloy;
b. sealing said combination into an extrusion canister;
c. extruding said canister assembly to a reduction ratio of from 6:1 to 100:1 or greater to form a solid beryllium/titanium composite;
d. subsequently separating said solid beryllium/titanium composite from said extrusion canister; and
e. tensile prestressing the extruded composite.

* * * * *

UNITED STATES PATENT OFFICE
CERTIFICATE OF CORRECTION

Patent No. 3,774,290          Dated November 27, 1973

Inventor(s) VERNON L. GOODWIN

It is certified that error appears in the above-identified patent and that said Letters Patent are hereby corrected as shown below:

Column 2, Line 15, "sealed" should read -- blend --.

Column 2, Lines 41 to 45, the table should read as follows:

|  | Modulus of Elasticity ($10^6$ psi) | Coefficient of Expansion Micro-in./in./°F. 0 - 1400°F. |
|---|---|---|
| Beryllium | 40-44 | 9.4 |
| Titanium | 16-19 | 6.2 |

Column 3, Line 6, "+50 + 100" should read -- -50 + 100".

Column 3, Line 13, "+325 mesh" should read -- -325 mesh --.

Columns 7-8, Table VII, Line 3 thereof, "+335 mesh" should read -- +325 mesh --.

Column 10, Line 62, after "per square inch," "and" should read -- said --.

Column 10, Line 65, "elastomer" should read -- elastomeric --.

Signed and sealed this 30th day of April 1974.

(SEAL)
Attest:

EDWARD M.FLETCHER,JR.          C. MARSHALL DANN
Attesting Officer          Commissioner of Patents